US007764686B1

(12) United States Patent
Toebes et al.

(10) Patent No.: US 7,764,686 B1
(45) Date of Patent: Jul. 27, 2010

(54) MIGRATION TO IPV6 USING COMBINATION OF GLOBALLY SIGNIFICANT AND LOCALLY SIGNIFICANT IPV4 ADDRESSES

(75) Inventors: John Albert Toebes, Cary, NC (US); Eric Levy-Abegnoli, Nice (FR); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 1250 days.

(21) Appl. No.: 10/326,471

(22) Filed: Dec. 19, 2002

(51) Int. Cl.
H04L 12/28 (2006.01)
(52) U.S. Cl. ........................ 370/392; 370/401
(58) Field of Classification Search ................ 370/466, 370/389, 392, 401; 709/230, 240
See application file for complete search history.

(56) References Cited

U.S. PATENT DOCUMENTS

| 6,038,233 | A | * | 3/2000 | Hamamoto et al. ......... 370/401 |
| 6,118,784 | A | * | 9/2000 | Tsuchiya et al. ............ 370/401 |
| 2004/0001509 | A1 | * | 1/2004 | Zhang et al. ................ 370/466 |

OTHER PUBLICATIONS

Borella et al., "RFC3102, Realm Specific IP: Framework", Oct. 2001.*
Landfeldt et al., "Expanding the Address space through REBEKAH-IP: An Architectural View", 2002.*
Borella et al. "RFC3103, Realm Specific IP: Protocol Specification", Oct. 2001.*
Postel, "Internet Protocol," RFC 791, Internet Engineering Task Force, Sep. 1981.
Rekhter, et al., "A Border Gateway Protocol 4 (BGP-4)," RFC 1771, Internet Engineering Task Force, Mar. 1995.
R. Gilligan, et al. "Transition Mechanisms for IPv6 Hosts and Routers," RFC 1933, Internet Engineering Task Force, Apr. 1996.
R. Callon, et al. "Routing Aspects of IPv6 Transition," RFC 2185, Internet Engineering Task Force, Sep. 1997.
S. Deering, "Internet Protocol, Version 6 (IPv6) Specification", IETF RFC 2460, Dec. 1998.
A. Conta, et al. "Generic Packet Tunneling in IPv6 Specification," RFC 2473, Internet Engineering Task Force, Dec. 1998.
B. Carpenter, et al. "Transmission of IPv6 over IPv4 Domains Without Explicit Tunnels," RFC 2529, Internet Engineering Task Force, Mar. 1999.
P. Marques, "Use of BGP-4 Multiprotocol Extensions for IPv6 Inter-Domain Routing" IETF RFC 2545, Mar. 1999.
P. Srisuresh, et al. "IP Network Address Translator (NAT) Terminology and Considerations," RFC 2663, Internet Engineering Task Force, Aug. 1999.

(Continued)

Primary Examiner—Jayanti K Patel
Assistant Examiner—Jung Park
(74) Attorney, Agent, or Firm—Cindy Kaplan

(57) ABSTRACT

Flexible migration from IPv4 to IPv6 is facilitated for the Internet and other data networks employing Internet Protocol. In one implementation, certain IPv4 nodes are enhanced by use of a dual address including a globally significant realm address and a locally significant address used only within a particular realm. This dual IPv4 address may be readily mapped to or from an IPv6 address. The enhancement and address mapping scheme may be used to automatically tunnel IPv6 packets through IPv4 infrastructure and to use enhanced IPv4 nodes to contact IPv6 infrastructure.

22 Claims, 10 Drawing Sheets

OTHER PUBLICATIONS

Tsirtsis, et al., "Network Address Translation—Protocol Translation (NAT-PT)," RFC 2766, Internet Engineering Task Force, Feb. 2000.

Tsuchiya, et al., "Dual Stack Hosts Using the Bump in the Stack Technique," RFC 2767, Internet Engineering Task Force, Feb. 2000.

T. Bates, "Multiprotocol Extensions for BGP-4" IETF RFC 2858, Jun. 2000.

E. Rosen, "Multiprotocol Label Switching Architecture", IETF RFC 3031. Jan. 2001.

Carpenter, et al., "Connection of IPv6 Domains via IPv4 Clouds," RFC 3056, Feb. 2001.

M. A. Miller, *Implementing IPv6, Second Edition: Supporting the Next Generation Protocols*, Ch. 9, pp. 285-310, 2000.

Templin et al., "Intra-Site Automatic Tunnel Addressing Protocol (ISATAP)", Internet Draft, Internet Engineering Task Force, Oct. 2002.

Levy-Abegnoli, et al., "IPv6 Over MPLS IPv4 Core", U.S. Appl. No. 10/013,818, filed Dec. 7, 2001.

Toebes et al., "Inter-v4 Realm Routing", U.S. Appl. No. 10/061,553, filed Feb. 1, 2002.

\* cited by examiner

MIGRATION TO IPV6 USING COMBINATION OF GLOBALLY SIGNIFICANT AND LOCALLY SIGNIFICANT IPV4 ADDRESSES

STATEMENT OF RELATED APPLICATIONS

The present application is related to the subject matter of U.S. application Ser. No. 10/061,553, filed Feb. 1, 2002, entitled "INTER-V4 REALM ROUTING," the contents of which are herein incorporated by reference in their entirety for all purposes.

BACKGROUND OF THE INVENTION

The present invention relates to data communication networks and more particularly to systems and methods for facilitating interoperation between currently deployed Internet infrastructure and newer Internet infrastructure employing next generation protocols.

To accommodate the explosive growth of the Internet, a very large number of network nodes have been configured to employ IP (Internet Protocol). These nodes range from user workstations to very high throughput core routers. There have been successive versions of IP. As of the filing date of the present application, the predominant variant of IP deployed in the field is IPv4.

The Internet engineering community is planning and implementing a shift from IPv4 to IPv6. Advantages of IPv6 include an enormous expansion in the available address space to accommodate greater ubiquity of Internet-enabled devices as well as reduced reliance on cumbersome network address translation schemes which have been utilized to conserve addresses. IPv6 also provides highly useful auto-configuration capabilities.

What is needed are systems and methods to ease the migration of the IPv4-based Internet to IPv6.

SUMMARY OF THE INVENTION

Embodiments of the present invention facilitate flexible migration from IPv4 to IPv6 for the Internet and other data networks employing Internet Protocol. In one implementation, certain IPv4 nodes are enhanced by use of a dual address including a globally significant realm address and a locally significant address used only within a particular realm. This dual IPv4 address may be readily mapped to or from an IPv6 address. The enhancement and address mapping scheme may be used to automatically tunnel IPv6 packets through IPv4 infrastructure and to use enhanced IPv4 nodes to contact IPv6 infrastructure.

A first aspect of the present invention provides a method for operating a client node. The method includes: formatting an IP packet to include a globally significant IPv4 realm address, identifying a destination realm and a locally significant address, identifying a destination of the IP packet within the realm, and transmitting the IP packet. The destination realm includes an IPv6 realm and the globally significant IPv4 realm address and the locally significant address together specify a globally significant IPv6 address.

A second aspect of the present invention provides a method for operating a gateway node to handle a name server request. The method includes: receiving, from a client node, a name server request specifying a destination host name, forwarding the name server request to an IPv6 name server, receiving an IPv6 address corresponding to the destination host name in response to the name server request, translating the IPv6 address to a combination of globally significant IPv4 realm address and a locally significant address, and forwarding the globally significant IPv4 realm address and the locally significant address to the client node.

A third aspect of the present invention provides a method for operating a gateway node to receive a packet. The method includes: extracting a globally significant IPv4 destination address from a destination address field of the packet and if the globally significant IPv4 destination address identifies a realm directly attached to the gateway node, extracting a locally significant address from the packet, constructing an IPv6 address from the globally significant address and the locally significant address, and forwarding the packet to a local destination within the realm in IPv6 format based on the IPv6 address.

A fourth aspect of the present invention provides a method of operating a node that operates as a gateway to an IPv6 realm. The method includes: receiving an IPv6 packet from within the IPv6 realm, extracting an IPv6 address from the IPv6 packet; translating the IPv6 address into a globally significant IPv4 realm address and an address that is locally significant within a destination realm, encapsulating the packet with the globally significant IPv4 realm address and the locally significant address; and forwarding the packet based on the globally significant IPv4 realm address.

Further understanding of the nature and advantages of the inventions herein may be realized by reference to the remaining portions of the specification and the attached drawings.

DESCRIPTION OF SPECIFIC EMBODIMENTS

Figure 1:
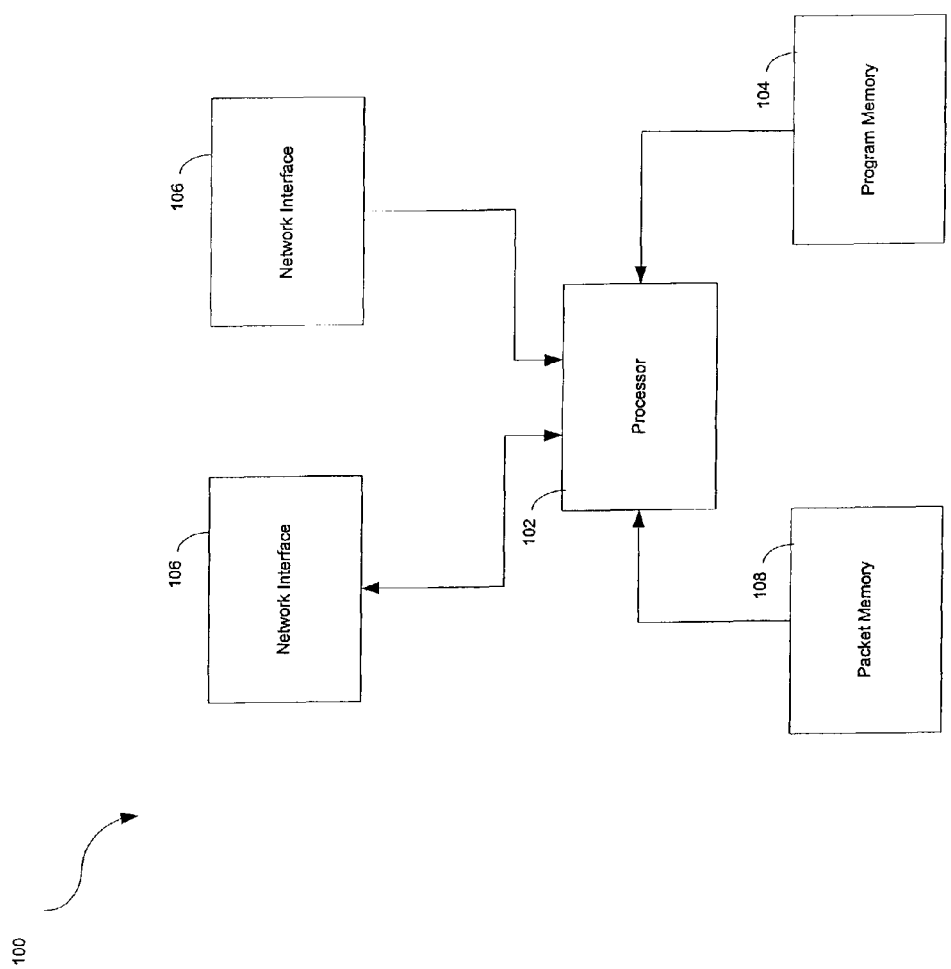
FIG. 1 depicts a network device according to one embodiment of the present invention.

FIG. 1 depicts a network device 100 that may be used to implement a network node operating in accordance with the present invention. In one embodiment, network device 100 is a programmable machine that may be implemented in hardware, software or any combination thereof. A processor 102 executes code stored in a program memory 104. Program memory 104 is one example of a computer-readable storage medium. Program memory 104 can be a volatile memory such as a random access memory (RAM). Another form of computer-readable storage medium storing the same codes would be some type of non-volatile storage such as floppy disks, CD-ROMs, DVD-ROMs, hard disks, flash memory, etc.

Network device 100 interfaces with physical media via a plurality (two are depicted) of network interfaces 106. For example, one of network interfaces 106 may couple to an optical fiber and may incorporate appropriate physical and link layer functionality. Other examples of network interfaces include Ethernet interfaces, DSL interfaces, Gigabit Ethernet interfaces, 10-Gigabit Ethernet interfaces etc. Packets that are received, processed, and forwarded by network device 100 may be temporarily stored in a packet memory 108. Depending on its role, network device 100 implements various network protocols, extensions thereof, and data networking features provided by the present invention as will be explained below.

The description that follows refers to various protocols in use on the Internet as specified by the following documents, all of which are incorporated by reference herein in their entirety for all purposes:

Postel, "Internet Protocol," Request for Comments 791, Internet Engineering Task Force, September 1981.
Rekhter, et al., "A Border Gateway Protocol 4 (BGP-4)," Request for Comments 1771, Internet Engineering Task Force, March 1995.
Tsuchiya, et al., "Dual Stack Hosts Using the "Bump in the Stack Technique," Request for Comments 2767, Internet Engineering Task Force, February 2000.
Tsirtsis, et al., "Network Address Translation—Protocol Translation (NAT-PT)," Request for Comments 2766, Internet Engineering Task Force, February 2000.
Deering, et al., "Internet Protocol, Version 6 (IPv6)," Request for Comments 2460, Internet Engineering Task Force, December 1998.
Templin, et al., "Intra-Site Automatic Tunnel Addressing Protocol (ISATAP)", Internet Draft, Internet Engineering Task Force, October 2002.
Carpenter, et al. "Transmission of IPv6 Over IPv4 Domains without Explicit Tunnels," Request For Comments 2529, Internet Engineering Task Force, March 1999.
Carpenter, et al. "Connection of IPv6 Domains via IPv4 Clouds," RFC 3056, February 2001.

Global Reachability of IPV4 Addresses

One embodiment of the present invention provides global reachability of EP addresses across the boundaries of IPv4 realms. Like the current public Internet, an IPv4 realm is defined by a full 4-byte address space. Locally significant addresses are defined to be those that are only significant and routable within the boundary of a given realm, and globally significant addresses are defined to be addresses that are reserved in all realms to identify realms or inter-realm routers. With this capability, clients can initiate sessions with clients or servers within other realms such as a privately addressed IPv4 network without the use of network address translation (NAT) or application gateways.

Figure 2:
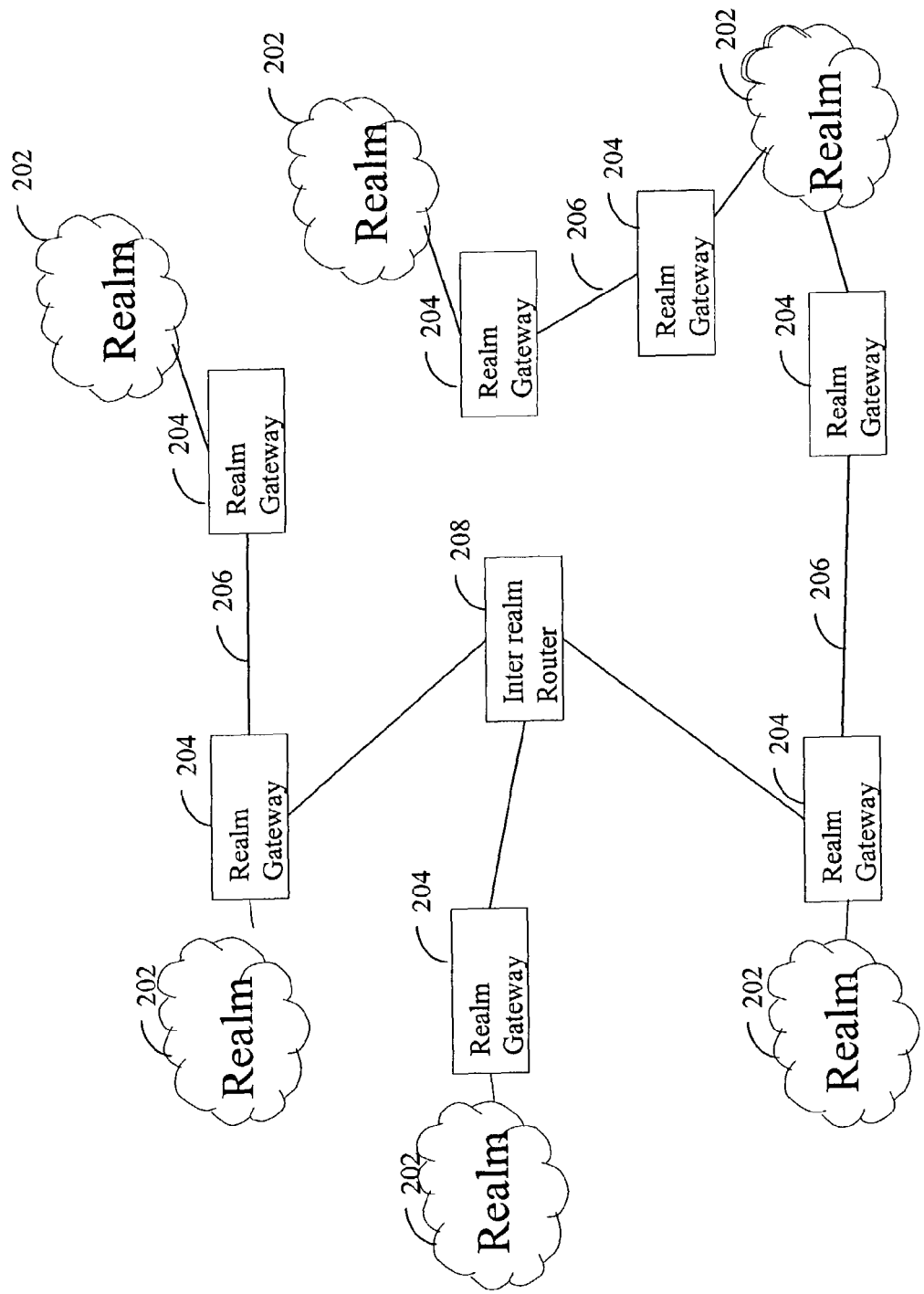
FIG. 2 depicts an arrangement of realms and realm gateways according to one embodiment of the present invention.

In an architecture provided by one embodiment of the present invention, realms are connected to the globally addressed network by realm gateways. FIG. 2 depicts such architecture. Each of realms 202 incorporates a cloud of network nodes having an IPv4 address unique within that realm but not globally unique. External access to each realm 202 is through one or more realm gateways 204. Realm gateways 204 are interconnected either point-to-point or through peer lines 206 or via inter-realm routers such as depicted inter-realm router 208 or via realms 202.

Figure 3:
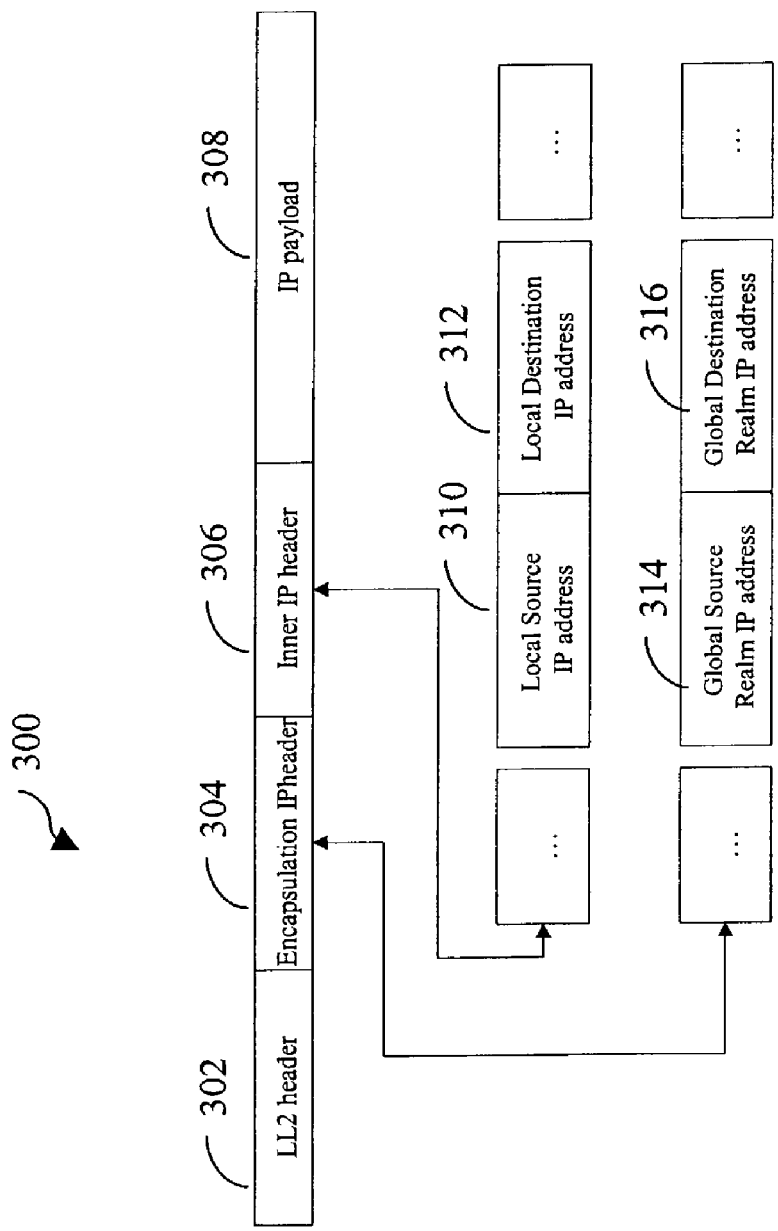
FIG. 3 depicts a packet structure employing both a globally significant IP address and a locally significant IP address according to one embodiment of the present invention.

Each realm has a globally significant IPv4 address. Routers such as inter-realm router 208 that interconnect realm gateways 204 may also be attributed globally significant addresses. The globally significant IPv4 address is preferably in a predefined range globally allocated for realm addresses. This range is reserved in all realms and cannot be used for locally significant addresses. Each node within one of realms 202 has a globally unique "address" that consists of a concatenation of its realm's globally significant IPv4 address and its own locally unique IPv4 address. FIG. 3 depicts a packet structure according to one embodiment of the present invention. A packet 300 includes an LL2 header 302 that includes link layer protocol information, an encapsulation IP header 304, an inner IP header 306, and an IP payload 308.

Details of encapsulation IP header 304 include a global source realm IP address 314 identifying the realm that sources the packet and a global destination realm IP address 316 identifying the realm of the packet's destination. Further contents of encapsulation IP header 304 may be specified by the GRE protocol as known in the art. Inner IP header 306 includes a local source IP address 310 giving the local IPv4 address of the packet source and local destination IP address 312 giving the local address of the packet destination. For both the destination and the source, the combination of local and realm addresses represents a "fully qualified" address.

Only one of the two destination address fields is used for forwarding at a time depending on the location of packet 300. Prior to reaching the destination realm, the global destination realm IP address 316 is used for forwarding decisions. Realm gateways 204 advertise, using BGP-4, for example, the globally significant addresses of the realms to which they are attached and the other realms that may be reached through them. The use of the global destination realm IP address 316 thus has the beneficial effect of aggregating traffic destined for the identified realm. Once the destination realm is reached, the local destination IP address field 312 is used for routing instead.

As a special case within this scheme, the current or "legacy" IPv4 address space will also be represented in two-part form. A specific global realm address is allocated to specify legacy IPv4 global addresses. The composite address of a node that has been previously allocated a globally significant address would include this specified global realm address and the legacy IPv4 address as the local address.

It will be appreciated that the concept that has been described is readily extendible to three or more levels of address hierarchy. For example, a packet may include a first header with global IP addresses, a second header with realm IP addresses significant only within a given realm, and a third header with sub-realm IP addresses significant only within a sub-realm.

Returning now to the discussion of the two-level address hierarchy illustrated in FIGS. 2-3, implementation preferably involves modifications at both gateways 204 and at nodes within realms 202. These modifications include modifications to the operation of applications operating at the client nodes, modifications to packet handling at the application gateway, and modifications to the processes of resolving names to IP addresses. Modifications within the inter-realm gateways are not necessary. These can continue to operate in accordance with standard IPv4 techniques.

Name Resolution

In one embodiment, an extension to the well-known DNS protocol is used to provide host names that may be resolved to the two-part addresses described above. This may be accomplished through a syntactical change to the DNS naming convention. For example, each realm may bear a worldwide, cross-realm, unique name in the form REALMNAME. Each node within such a realm may have a name in the form LOCAL-DNS@REALMNAME. A client outside the realm seeking to resolve a name in the form LOCALDNS@REALMNAME will first send a request to its global DNS server requesting a record for REALMNAME. What will be returned will be a globally significant IP address for REALMNAME plus an address for a DNS server. The DNS server address will typically be a locally significant IPv4 address for the DNS server within the target realm. Using both addresses, the client contacts this latter DNS server to resolve LOCAL-DNS to a locally significant address. With the locally significant address and the globally significant realm address, the client has the information to populate the destination fields of packet 300.

The present invention is not, however, limited to DNS resolution techniques. For example, for voice over IP (VoIP) applications, SIP may be used to resolve a single phone number to a combination of globally significant realm address and locally significant node address. In this case, an SIP server would be contacted to obtain address information.

Client Node Operation

Figure 4:
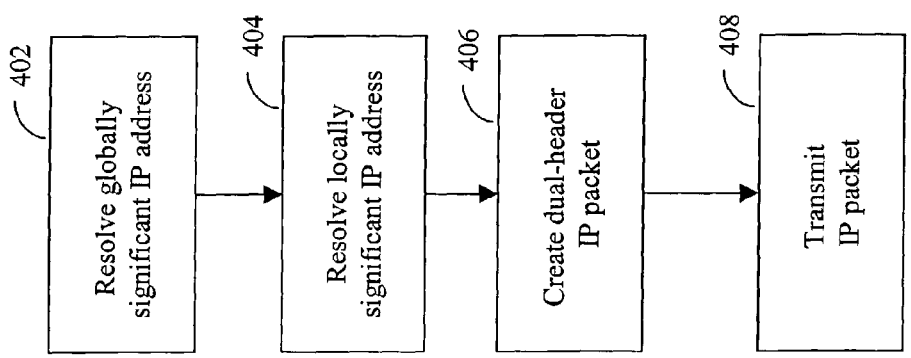
FIG. 4 is a flowchart describing steps of operating a client node according to one embodiment of the present invention.

FIG. 4 is a flowchart describing steps of operating a client node to generate and transmit a packet according to one embodiment of the present invention. The steps of FIG. 4 are particularly relevant to the case of using the client node to initiate a session with a remote node within a remote realm. At a step 402, the client node resolves a destination name to a globally significant realm IP address as described above or by some other technique. At a step 404, the client node resolves the destination name to a locally significant IP address as described above or by some other technique. In some implementations, these steps are essentially performed together. These resolution steps need not be repeated for successive transmissions to the same node.

At a step 406, the client forms a packet in the form illustrated in FIG. 3. The client is aware of its realm address and of course of its locally significant address. These are used to fill in the local source address 310 and global source realm IP address 314. The local destination IP address 312 is obtained from the result of step 404. The globally significant destination realm IP address is obtained from the result of step 402. The packet is transmitted at step 408.

To facilitate implementation, a socket interface is extended to accommodate both the globally significant realm address and the locally significant address. If the remote node initiates the session, the remote node's globally significant address and locally significant address are learned from the incoming packets.

It should be noted that when the source realm and the destination realm are the same, there is no need to use the encapsulation format of FIG. 3 or any modification to the conventional IPv4 operation. As a consequence, legacy IPv4 devices can still communicate within the boundaries of their own realm with other legacy systems as well as with systems implementing this invention.

The above-described steps of FIG. 4 represent a change to conventional IPv4 operation. In one embodiment, individual applications such as web browsers, e-mail programs, VoIP clients, etc. are modified to implement the DNS operations and the encapsulation. These applications are aware of both the client's locally significant address and the client's globally significant realm address.

Alternatively, the client is not modified but a thin layer is implemented at the client node or at a gateway to effectively translate between the prior art IPv4 address scheme and the extended scheme of the present invention. For example, one may adapt a solution already developed for IPv6, such as, e.g., Bump-In-The-Stack, and NAT-PT, as disclosed in the Request for Comment documents cited above. The socket is aware of the client's globally significant realm address even if the client application is not. The socket intercepts DNS or other name service requests from the client application and obtains the necessary address information in accordance with steps 402 and 404. Only the locally significant IPv4 address, or a forged IP address used as a correlator, is returned to the application for use in generating packets. When the socket receives a packet from the application with this address, it uses this address as an identifier to retrieve the full destination address information for the session including the globally significant destination address. The socket generates and transmits the packet to the destination in accordance with the full destination address information. Similarly, received packets of the session are stripped of their globally significant address information before being sent to the client application.

The socket is also capable of acting on behalf of a remote node to establish a new session with the application. The application receives only the locally significant IPv4 address information for use in sending packets to the remote node. Again, the socket uses this address as a reference to the full address of the remote node.

Routing Through Intermediate Nodes

Routing from the originating node to a realm gateway attached to the destination's realm proceeds in accordance with the IP routing protocols operative at intermediate nodes. Forwarding decisions are based on global destination realm IP address 316. Realm gateways 204 advertise their access to realms 202 using, e.g., BGP-4. A realm may have more than one gateway that advertises access to that realm.

Figure 5:
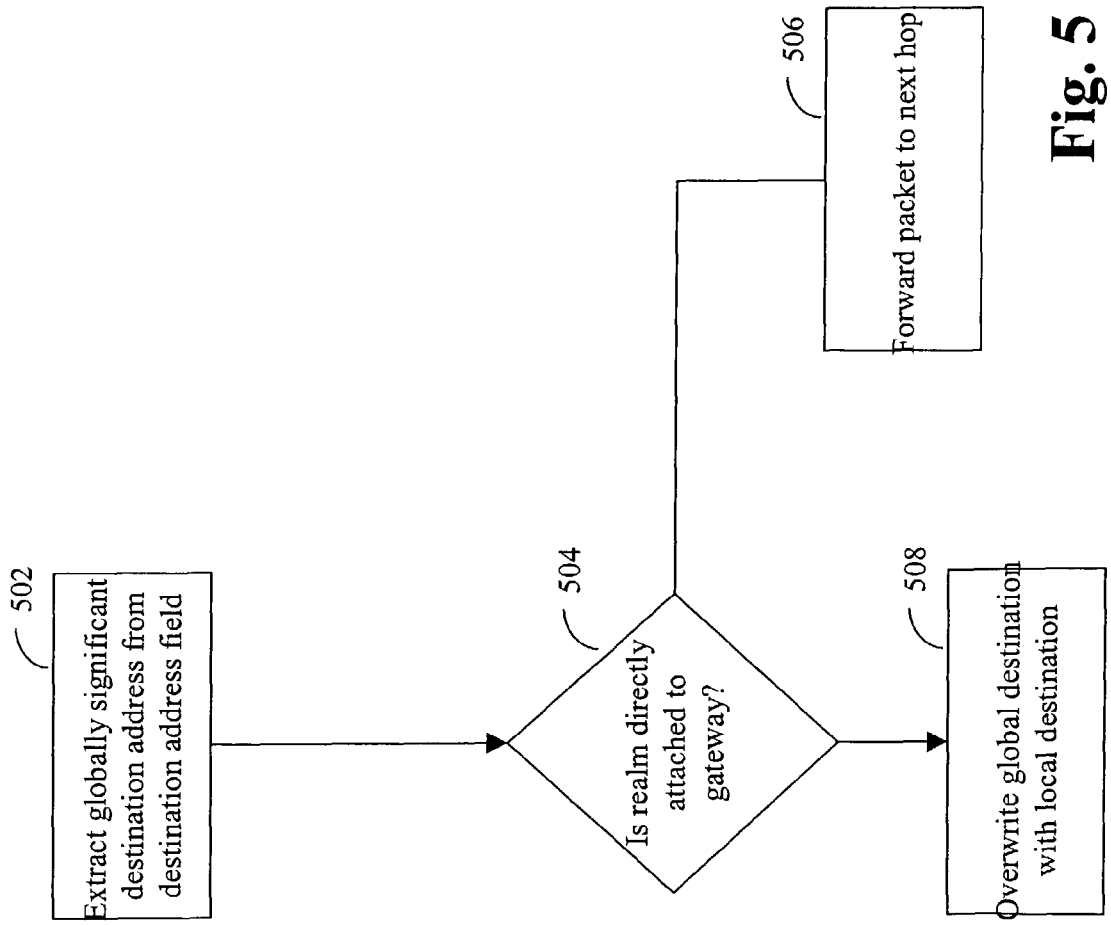
FIG. 5 is a flowchart describing steps of operating a realm gateway node according to one embodiment of the present invention.

The operation of realm gateways 204 is modified to facilitate the handling of packet 300. FIG. 5 is a flowchart describing steps of handling a received packet at a realm gateway according to one embodiment of the present invention. At step 502, the globally significant destination realm IP address 316 is extracted. At step 504, this extracted address is tested to compare it to the realm address of the realm attached to the gateway. If the packet is not addressed to the gateway's attached realm, it is forwarded in a conventional manner at step 506 with the globally significant destination address being used as a key to a forwarding table to select a next hop.

If step 504 determines that the packet is in fact addressed to the gateway's attached realm, then processing proceeds to step 508. At step 508, the global destination address 316 is replaced by the local destination address 312. The locally significant destination IP address is then used as the key to a forwarding table to select a next hop into the attached realm. The packet is then forwarded to this next hop. Further forwarding within the destination realm is based on the locally significant IP address.

Interoperation with IPv6

In accordance with one embodiment of the present invention, the addressing scheme and packet encapsulation technique described above is used to facilitate interoperation between IPv4 nodes and IPv6 nodes. For simplicity of description, IPv4 nodes, realms, and networks that have been enhanced in accordance with the addressing and encapsulation techniques described above will be denoted as IPv4+. Furthermore, according to embodiments of the present invention, IPv6 nodes may also incorporate the modified IPv4 functionality described above. Such IPv6 nodes and networks are herein referred to as IPv6–. IPv6– nodes may also be capable of conventional IPv4 operation. As will be seen, the IPv4+ techniques facilitate simple interoperation between IPv4 nodes and IPv6 nodes and greatly expand options for migration from IPv4 to IPv6.

Routing Between A v4+ Realm and v6 Realm

Figure 6:
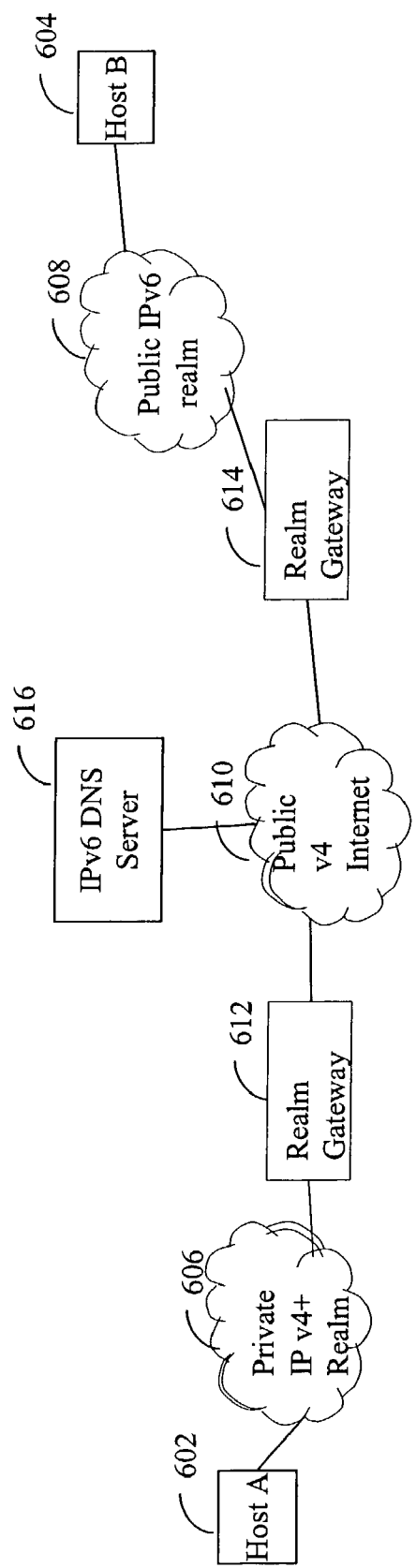
FIG. 6 depicts a network configuration where packets may be routed between an enhanced (IPv4+) realm and an IPv6 realm according to one embodiment of the present invention.

FIG. 6 depicts a particular scenario to which embodiments of the present invention may be applied. A host A 602 desires to communicate with a host B 604. Host A 602 belongs to a private IPv4+ realm 606 while host B 604 belongs to a public IPv6 network 608. Private IPv4+ realm 606 is connected to public IPv4 Internet 610 via a realm gateway 612. Public IPv6 network 608 is coupled to public IPv4 Internet 610 via a realm gateway 614. Also, an IPv6 DNS server 616 is accessible via public IPv4 internet 610.

Message flow between the two hosts will first be described generally and then step by step. First host A resolves the name of host B. In the depicted embodiment this is done via IPv6 DNS server 616. A single inquiry to IPv6 DNS server 616 will return the IPv6 address of host B 604, sufficient information to establish a session. Alternatively, the host B name may be in the form "local DNS@realm" and host A 602 can transmit two IPv4 DNS queries to an IPv4 DNS server, one on "local DNS" and one on "realm" as described above in the "NAME RESOLUTION" section.

Packet forwarding is through a tunnel initiated at host A 602. The packet format of FIG. 3 is used. Assuming that an IPv6 address has been obtained, a mapping to the IPv4+ address format takes place. The mapping operation may be performed with well-known techniques such as Bump-In-the Stack (BIS) or Bump-In-the-API (BIA). Preferably, the mapping is greatly simplified because the IPv6 address has been chosen such that a portion corresponds directly to the global destination realm address 316 of public IPv6 realm 608. Another portion of the IPv6 address may be used as the local destination IP address 312. When the packet arrives at realm gateway 614, the encapsulated v4+ packet may be readily reformatted as an IPv6 packet by reversing the IPv4+ to IPv6 address mapping.

Figure 8:
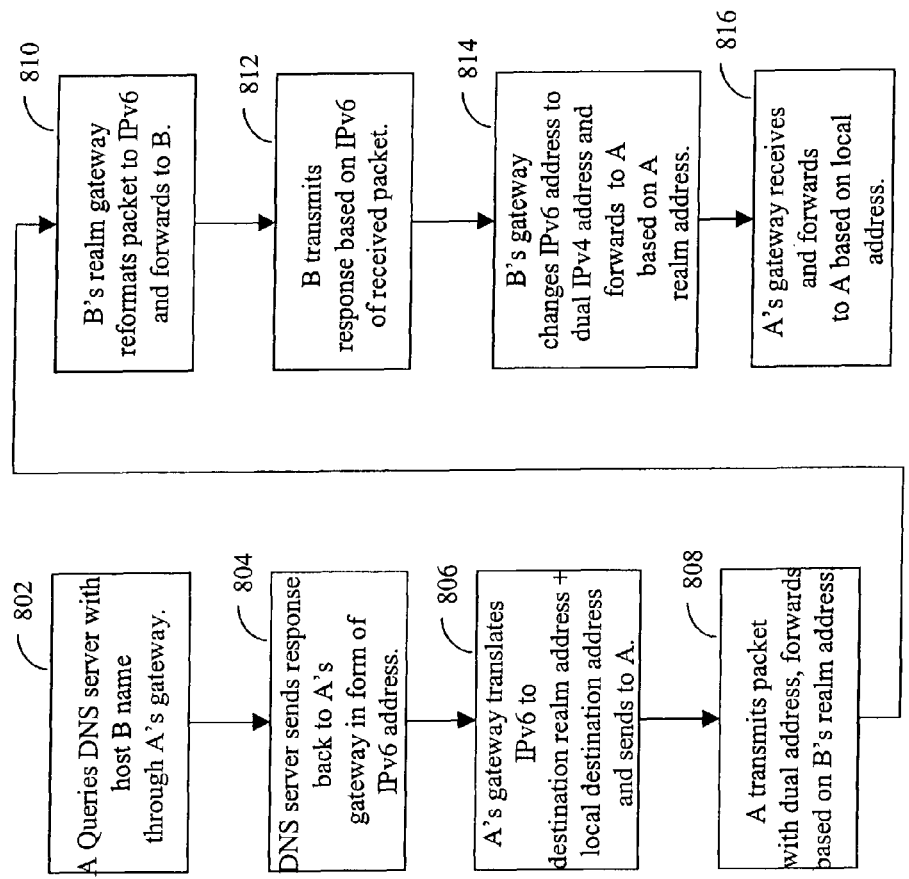
FIG. 8 is a flow chart describing steps of transmitting a packet from an enhanced IPv4 (IPv4+) node to an IPv6 node according to one embodiment of the present invention.

FIG. 8 is a flow chart describing in detail a packet exchange between IPv4+ host A 602 and IPv6 host B 604. Operation begins with name resolution at step 802. At step 802, host A 602 queries DNS server 616 to find the address of host B 604. In the example here, this is a DNS IPv6 query. The query is relayed by realm gateway 612 which should operate as the query source since the address of host A 602 lacks global significance. For a realm gateway 612 to reach the IPv6 DNS server 616, it may use a mechanism such as ISATAP as known in the art. It is also possible for a DNS server to operate locally with realm gateway 612 or even internally to realm gateway 612.

At step 804, DNS server 616 sends a response back to realm gateway 612 in the form of the IPv6 address of host B 604. Step 806, realm gateway 612 may translate the IPv6 address to the IPv4+ format, i.e., combination of globally significant realm address and locally significant address prior to forwarding to host A 602. The IPv6 address may be understood to include [HB∥GW2] where GW2 is a globally significant IPv4 realm address of public IPv6 network 608 (or realm gateway 614) and HB is understood as the locally significant address of host B 604.

Host A 602 then establishes an automatic stateless tunnel to realm gateway 614. The tunnel is implemented simply by encapsulation in the packet format of FIG. 3 as performed by host A 602. In reference to FIG. 3, the global source realm IP address 314 is the globally significant realm address of private IPv4+ realm 606. The global destination realm IP address 316 is address GW2 of public IPv6 network 608. With step 808, host A 602 forms an encapsulated packet and transmits it. The forwarding of this packet through private IPv4+ network 606 and public IPv4 Internet 610 will be based on the globally significant IPv4 realm address GW2.

At step 810, realm gateway 614 receives the packet and reformats the packet to IPv6 for forwarding across public IPv6 network 608 to host B 604. The IPv6 destination address is easily obtained by reversing the address mapping applied at Host A 602. A similar mapping is also applied to generate an IPv6 source address to represent host A 602. This IPv6 source address includes the locally significant IPv4 address of host A 602 and GW1, the globally significant realm address of private IPv4+ realm 606 (or realm gateway 612). The translation between IPv4 and IPv6 may be performed using the BIS and BIA techniques referred to above.

The remaining steps of FIG. 8 concern host B 604 transmitting a response packet back to host A 602. At step 812, host B 604 transmits a response back to host A 602. The response is an IPv6 packet with the IPv6 destination address being the source IPv6 address of the packet that host B 604 has received. At step 814, realm gateway 614 reformats the IPv6 packet into the format of FIG. 3 replacing the IPv6 destination address with the dual IPv4 address including the locally significant address HA and the globally significant realm address GW1. This encapsulation places the packet into an automatic tunnel to realm gateway 612. Forwarding across public IPv4 Internet 610 is then based on address GW1. At step 816, realm gateway 612 receives the response packet. The encapsulation IP header and inner IP header 306 are swapped so that further forwarding within IPv4+ realm 606 is based on the locally significant destination address HA.

Figure 9:
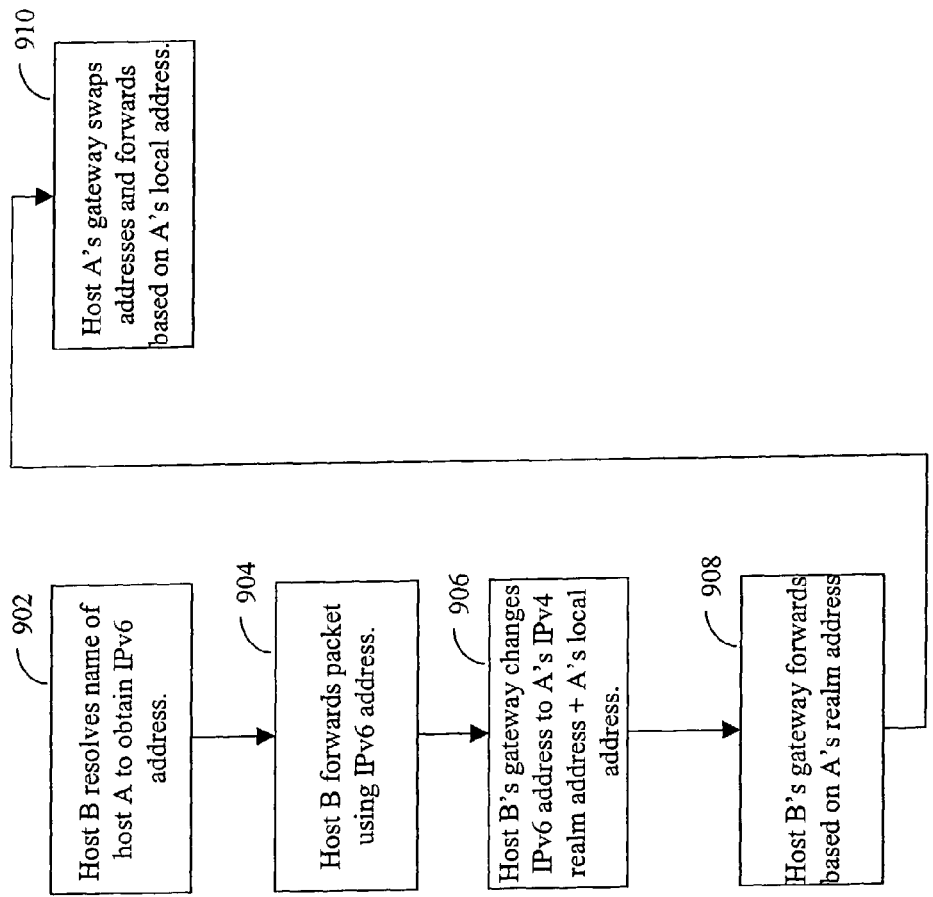
FIG. 9 is a flow chart describing steps of transmitting a packet from an IPv6 node to an enhanced IPv4 (IPv4+) node according to one embodiment of the present invention.

Alternatively, host B may be the one to initiate contact. The message flow is quite similar. FIG. 9 is a flow chart describing operations in exchanging packets between host B 604 and host A 602 at the initiation of host B 604. At step 902, host B 604 resolves the name of host A 602 to obtain an IPv6 address. This is done by use of IP v6 DNS server 616 which holds an IPv6 version of the dual address of host A 602. Communication between realm gateway 614 and DNS server 616 may be by way of ISATAP tunnel as mentioned above. The IPv6 address of course contains the locally significant destination address HA and the globally significant destination realm address GW1 to facilitate mapping. At step 904, host B 604 forwards a packet using the IPv6 address obtained in step 902.

At step 906, realm gateway 614 extracts the locally significant address HA and the globally significant realm address GW1 from the IPv6 address and forms the encapsulated packet structure of FIG. 3. An IPv4+ packet as shown in FIG. 3 can then be sent across public IPv4 Internet 610 at step 908. Forwarding across network 610 is based on destination realm address GW1. At step 910, the packet reaches realm gateway 612. Realm gateway 612 then swaps the encapsulation IP header 304 and the inner IP header 306 so that further forwarding to host A 602 via private IPv4+ network 606 is based on the locally significant address HA. Note that DNS is only a representative name resolution mechanism. SIP or some other suitable protocol could be used also.

It can be seen that host A operates in accordance with the IPv4+ encapsulation and addressing scheme previously described without the necessity of further modification to accommodate interoperability with IPv6. Realm gateway 612 is capable of processing received encapsulated packets and switching IP headers to accommodate forwarding to nodes within network 606. Realm gateway 612 is also capable of translating IPv6 addresses retrieved from external DNS v6 servers into the IPv4+ format.

Realm gateway 614 is capable of translating between IPv6 and IPv4+ packet and address formats. As for host B 604, it may operate with IPv6 client software and an IPv6 stack without the necessity of modifications to accommodate interoperation with IPv4.

Generalized Routing Among IPv4 and IPv6 Realms

Figure 7:
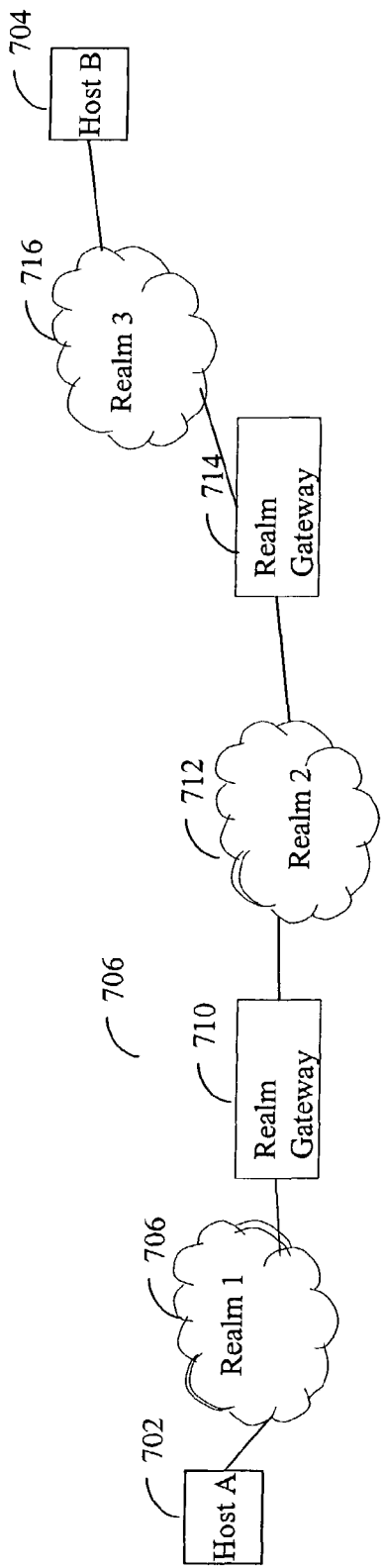
FIG. 7 depicts a generalized multi-realm network to which embodiments of the present invention may be applied.

FIG. 7 depicts a generalized multi-realm network to which embodiments of the present invention may be applied. Here, a host A 702 communicates with a host B 704. Host A belongs to a realm 1 706. Host B belongs to a realm 3 708. A realm gateway 710 interconnects realm 1 706 to a realm 2 712. A realm gateway 714 interconnects realm 3 708 to realm 2 712. FIG. 7 will be helpful in exploring various routing scenarios.

If realm 1 706 is an IPv4 realm, the client applications on host A 702 could be modified to perform the global two-part DNS resolution and to perform the encapsulation of FIG. 3. To accommodate legacy IPv4 applications, a thin layer below the client layer and above the IPv4 stack should be inserted to implement IPv4+ connectivity while providing an IPv4 interface to the client applications. The thin layer is aware of both its globally significant realm address and locally significant address and understands how to swap source and destination address pairs to construct replies. With use of an appropriate additional interface, a thin layer such as this can also support IPv6 client applications. Host A 602 may then also be viewed as an IPv6− node.

If realm 1 is an IPv6 realm then the IP stack is an IPv6 stack that operates in accordance with the relevant IPv6 standards and supports IPv6 client applications. Mapping to and from the IPv4+ format is performed by realm gateway 710. IPv6 addresses within realm 1 706 should preferably comply to a format that facilitates extraction of globally significant and locally significant IPv4 addresses. Any necessary modifications within realm 3 708 would be the same as they are for realm 1 706 in either the IPv4 or IPv6 case.

As for realm 2 710, it may be either an IPv6 or an IPv4 network. In either case, the unmodified IPv6 or IPv4 routing operations may be used because both the destination Ipv6 address and the destination realm IPv4 address are globally significant.

It should be noted that routing within the same realm does not require encapsulation regardless of whether the realm is an IPv4 realm or an IPv6 realm. The standard IPv4 format or IPv6 format may be used without modification.

IPv6 Transition Strategies

The interoperation capability between IPv4 and IPv6 nodes provided by the present invention facilitates numerous intermediate configurations between legacy IPv4 networks and networks that have fully implemented IPv6. The broad range of possible configurations provides the network planner many possible migration paths.

Figure 10:
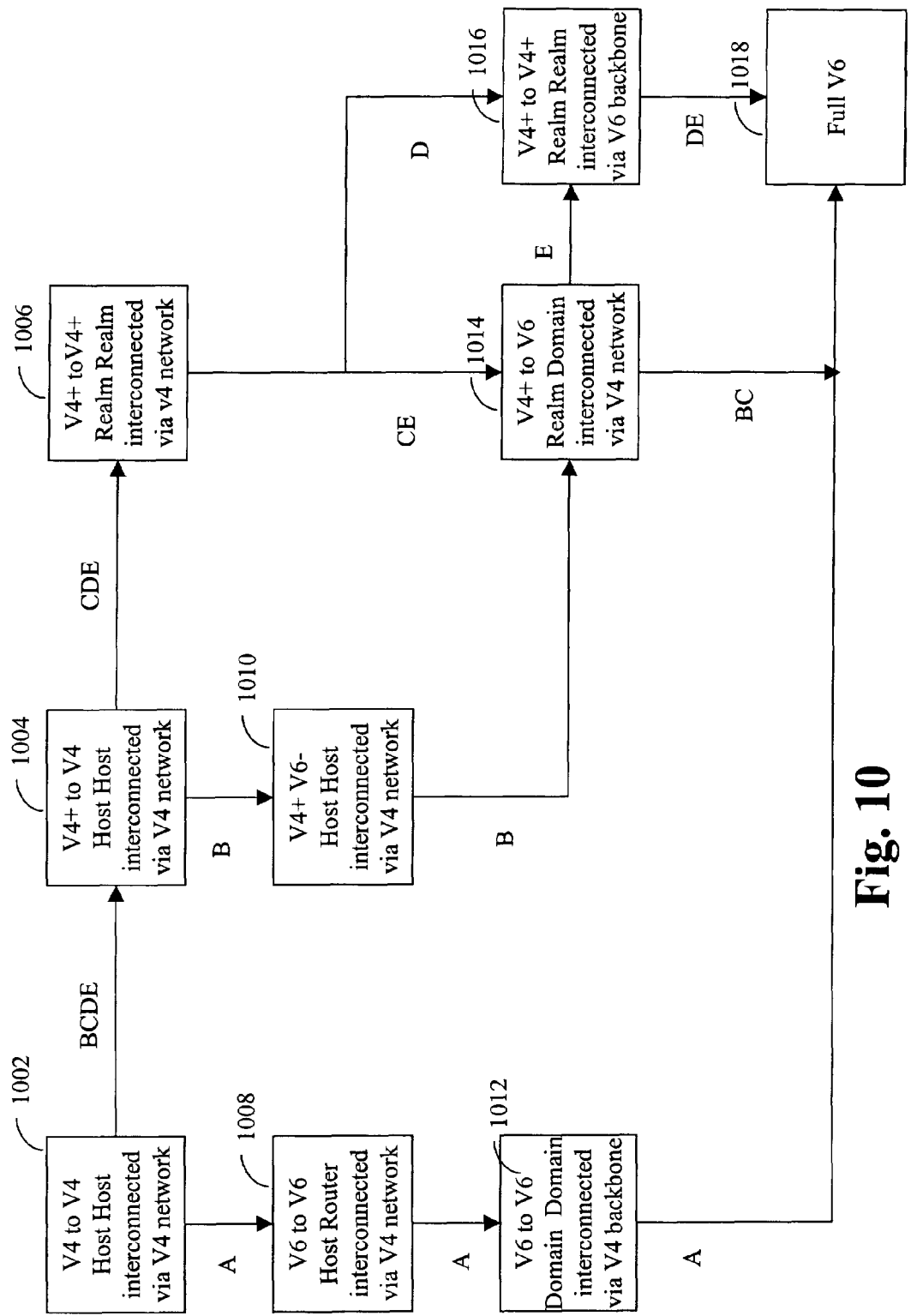
FIG. 10 is a diagram describing various migration paths for transitioning from an IPv4-based network to an IPv6-based network according to embodiments of the present invention.

FIG. 10 depicts a number of possible configurations and migration paths according to embodiments of the present invention. A configuration 1002 represents IPv4 hosts communicating via an IPv4 network, the legacy configuration. Configuration 1018 is a full IPv6 network where IPv6 hosts communicate using IPv6 packets without the necessity to interoperate with IPv4 equipment.

Configurations 1008 and 1012 correspond to a prior art migration strategy signified by the path A from configuration 1002 to configuration 1018. In configuration 1008, scattered IPv6 workstations exist on an IPv4 network using IPv6 routers for interconnection. The IPv6 workstations tunnel to the IPv6 routers using the ISATAP protocol. The next step along the migration, configuration 1012, domains of IPv6 equipment are interconnected via an IPv4 backbone. The interconnection across the IPv4 backbone is by use of IPv4 tunnels using the well-known 6-to-4 tunneling technique.

The present invention provides the possibility of smoother migration using paths through other configurations as will be described. The precise path to IPv6 becomes a network management decision. There is a broad latitude to evolve towards full IPv6 capability on a per-station basis, a per-network basis, or to accelerate or decelerate the migration as desired.

In a configuration 1004, scattered standalone IPv4+ hosts are introduced into an IPv4 network as well as IPv4+ DNS support, i.e., gateways and hosts change their handling of DNS requests. All of the IPv4 and IPv4+ hosts belong to the same realm. Thus, the IPv4+ capabilities are not actually used at this stage since IPv4 may be used to communicate with any node within the realm. This step, however, prepares effectively for further migration.

A configuration 1010 represents one possible progression beyond configuration 1004. In configuration 1010, scattered stand-alone IPv6− hosts are introduced into the IPv4 network as well as IPv6 DNS servers. All of the IPv4, IPv4+, and IPv6− hosts continue to share the same realm. All of the hosts communicate within the same realm using plain IPv4 format.

An alternative successor to configuration 1004 is a configuration 1006. In configuration 1006, several IPv4+ realms are interconnected via a common IPv4 backbone such as the Internet. IPv4 and IPv4+ hosts may communicate within an IPv4+ realm. IPv4+ realm inter-realm communication is also available as described in reference to FIGS. 4-5.

A configuration 1014 may follow either configurations 1010 or 1006. In configuration 1014, IPv6 islands exist within an IPv4 realm such as the Internet. This is the scenario contemplated by the 6-to-4 tunneling scheme but here a different interconnection solution is available. The IPv6 addresses of nodes within the IPv6 islands are specified to contain two embedded IPv4 addresses, a globally significant one for the realm and a local one for the destination with that realm. Gateways at the border of the IPv6 islands can translate between the IPv6 header format and the IPv4+ format of FIG. 3. IPv4+ tunneling can thus be used between the IPv6 islands. Also, by use of the IPv4+ format, IPv4+ hosts outside the IPv6 islands can communicate with IPv6 hosts within the islands.

A configuration 1016 may follow configurations 1010, 1006, or 1014. In configuration 1016, the backbone network is IPv6 but residual IPv4+ realms persist. Within the IPv4+ realms, there may be IPv4, IPv4+ and IPv6− hosts. Gateways to the IPv4+ realms convert between IPv4+ and IPv6 formats. IPv4+ hosts within these realms connect to IPv4, IPv4+, and IPv6− hosts within their own realm, IPv4+ and IPv6− hosts in other realms, and the conventional IPv6 hosts in the backbone.

The prior art migration strategy marked as A passes through configurations 1008 and 1012. Paths B through E are provided by the present invention. The B migration path provided by the present invention passes through configurations 1004, 1010, and 1014. The C migration path passes through configurations 1004, 1006, and 1014. The D migration path passes through configurations 1004, 1006, and 1016. An E migration path passes through configurations 1004, 1006, 1014, and 1016. These configurations and paths should not be seen as exhaustive of the possible configurations and migration paths provided by embodiments of the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. In a data communication network, a method for operating a client node, said method comprising:
    formatting an IP packet at the client node to include:
        a globally significant IPv4 realm address identifying a destination IPv6 realm, said globally significant IPv4 realm address comprising a full 4-byte address; and
        a locally significant address identifying a destination of said IP packet within said realm; and
    transmitting said IP packet from the client node; and
    wherein said globally significant IPv4 realm address and said locally significant address together specify a globally significant IPv6 address, and said globally significant IPv6 address includes said globally significant IPv4 address and said locally significant address.

2. The method of claim 1 further comprising:
    resolving said globally significant IPv4 realm address and said locally significant address from a globally significant name via a gateway that translates said globally significant IPv6 address into said globally significant IPv4 realm address and said locally significant address.

3. The method of claim 1 further comprising transmitting a name server request specifying a destination host name and receiving said globally significant IPv4 realm address and said locally significant address.

4. The method of claim 3 wherein said name server comprises a DNS IPv6 name server.

5. A method of operating a node that operates as a gateway to an IPv6 realm, said method comprising:
    receiving an IPv6 packet from within said IPv6 realm at the node;
    extracting an IPv6 address from said IPv6 packet at the node; and
    translating at the node, said IPv6 address into a globally significant IPv4 realm address identifying a destination IPv4 realm and an address that is locally significant within said destination IPv4 realm;
    encapsulating said packet at the node, with said globally significant IPv4 realm address and said locally significant address; and
    forwarding said packet from the node based on said globally significant IPv4 realm address;
    wherein said globally significant IPv4 realm address comprises a full 4-byte address, and said IPv6 address includes said globally significant IPv4 realm address and said locally significant address.

6. In a data communication network, apparatus for operating a client node, said apparatus comprising:
    a processor that formats an IP packet to include a globally significant IPv4 realm address identifying a destination IPv6 realm and a locally significant address identifying a destination of said IP packet within said IPv6 realm, said globally significant IPv4 realm address comprising a full 4-byte address; and
    a network interface that transmits said IP packet; and
    wherein said globally significant IPv4 realm address and said locally significant address together specify a globally significant IPv6 address, and said globally significant IPv6 address includes said globally significant IPv4 realm address and said locally significant address.

7. The apparatus of claim 6 wherein said processor resolves said globally significant IPv4 realm address and said locally significant address from a globally significant name via a gateway that translates said globally significant IPv6 address into said globally significant IPv4 realm address and said locally significant address.

8. The apparatus of claim 6 wherein the processor is configured to transmit a name server request specifying a destination host name and receive said globally significant IPv4 realm address and said locally significant address.

9. The apparatus of claim 8 wherein said name server comprises a DNS IPv6 name server.

10. Apparatus for operating a node that operates as a gateway to an IPv6 realm, said apparatus comprising:
    a processor;
    and a memory that stores instructions for operating said processor, said instructions comprising:
        code that receives an IPv6 packet from within said IPv6 realm;
        code that extracts an IPv6 address from said IPv6 packet;
        code that translates said IPv6 address into a globally significant IPv4 realm address identifying a destination IPv4 realm and an IPv4 address that is locally significant within said destination IPv4 realm;
        code that encapsulates said packet with said globally significant IPv4 realm address and said locally significant address; and
        code that forwards said packet based on said globally significant IPv4 realm address;
    wherein said globally significant IPv4 realm address comprises a full 4-byte address, and said IPv6 address includes said globally significant IPv4 realm address and said locally significant address.

11. The apparatus of claim 10 further comprising code that transmits a name server request specifying a destination host name and code that receives said globally significant IPv4 realm address and said locally significant address.

12. The apparatus of claim 11 wherein said name server comprises a DNS IPv6 name server.

13. In a data communication network, a computer-readable storage medium encoded with a computer program for operating a client node, said computer program comprising:
    code that formats an IP packet to include a globally significant IPv4 realm address identifying a destination IPv6 realm and a locally significant address identifying a destination of said IP packet within said IPv6 realm, said globally significant IPv4 realm address comprising a full 4-byte address; and
    code that transmits said IP packet;
    wherein said globally significant IPv4 realm address and said locally significant address together specify a globally significant IPv6 address, and said globally significant IPv6 address includes said globally significant IPv4 realm address and said locally significant address.

14. The computer-readable storage medium of claim 13 further comprising:
    code that resolves said globally significant IPv4 realm address and said locally significant address from a globally significant name via a gateway that translates said globally significant IPv6 address into said globally significant IPv4 realm address and said locally significant address.

15. The apparatus of claim 13 further comprising code that transmits a name server request specifying a destination host name and code that receives said globally significant IPv4 realm address and said locally significant address.

16. The apparatus of claim 15 wherein said name server comprises a DNS IPv6 name server.

17. A computer-readable storage medium encoded with a computer program for operating a node that operates as a gateway to an IPv6 realm, said computer program comprising:
- code that receives an IPv6 packet from within said IPv6 realm;
- code that extracts an IPv6 address from said IPv6 packet; and
- code that translates said IPv6 address into a globally significant IPv4 realm address identifying a destination IPv4 realm and an IPv4 address that is locally significant within a destination realm;
- code that encapsulates said packet with said globally significant IPv4 realm address and said locally significant address; and
- code that forwards said packet based on said globally significant IPv4 realm address;
- wherein said globally significant IPv4 realm address comprises a full 4-byte address, and said IPv6 address includes said globally significant IPv4 realm address and said locally significant address.

18. In a data communication network, apparatus for operating a client node, said apparatus comprising:
- means for formatting an IP packet to include a globally significant IPv4 realm address identifying a destination IPv6 realm and a locally significant address identifying a destination of said IP packet within said IPv6 realm, said globally significant IPv4 ream address comprising a full 4-byte address; and
- means for transmitting said IP packet;
- wherein said globally significant IPv4 realm address and said locally significant address together specify a globally significant IPv6 address, and said globally significant IPv6 address includes said globally significant IPv4 realm address and said locally significant address.

19. The apparatus of claim 18 further comprising:
- means for resolving said globally significant IPv4 realm address and said locally significant address from a globally significant name via a gateway that translates said globally significant IPv6 address into said globally significant IPv4 realm address and said locally significant address.

20. Apparatus for operating a node that operates as a gateway to an IPv6 realm, said apparatus comprising:
- means for receiving an IPv6 packet from within said IPv6 realm;
- means for extracting an IPv6 address from said IPv6 packet; and
- means for translating said IPv6 address into a globally significant IPv4 realm address identifying a destination IPv4 realm and an IPv4 address that is locally significant within said destination IPv4 realm;
- means for encapsulating said packet with said globally significant IPv4 realm address and said locally significant address; and
- means for forwarding said packet based on said globally significant IPv4 realm address;
- wherein said globally significant IPv4 realm address comprises a full 4-byte address, and said IPv6 address includes said globally significant IPv4 realm address and said locally significant address.

21. The apparatus of claim 20 further comprising means for transmitting a name server request specifying a destination host name and receiving said globally significant IPv4 realm address and said locally significant address.

22. The apparatus of claim 21 wherein said name server comprises a DNS IPv6 name server.

* * * * *